United States Patent
Liu et al.

(10) Patent No.: US 9,554,026 B2
(45) Date of Patent: Jan. 24, 2017

(54) IMAGE-CAPTURING APPARATUS

(71) Applicant: TOPRAY MEMS INC., Hsinchu (TW)

(72) Inventors: Chin-Sung Liu, Hsinchu (TW); Yi-Jung Chen, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 14/631,994

(22) Filed: Feb. 26, 2015

(65) Prior Publication Data

US 2016/0219198 A1 Jul. 28, 2016

(30) Foreign Application Priority Data

Jan. 23, 2015 (TW) .............................. 104201178 U

(51) Int. Cl.
H04N 5/225 (2006.01)

(52) U.S. Cl.
CPC .......... H04N 5/2254 (2013.01); H04N 5/2252 (2013.01); H04N 5/2253 (2013.01); H04N 5/2257 (2013.01)

(58) Field of Classification Search
None
See application file for complete search history.

(56) References Cited

U.S. PATENT DOCUMENTS

| | | | | |
|---|---|---|---|---|
| 7,612,957 B1* | 11/2009 | Wu | ........................ | G02B 7/08 359/819 |
| 2001/0055073 A1* | 12/2001 | Shinomiya | ........ | H01L 27/14618 348/374 |
| 2002/0047119 A1* | 4/2002 | Honda | .............. | H01L 27/14618 257/59 |
| 2002/0145676 A1* | 10/2002 | Kuno | ....................... | G02B 7/02 348/340 |
| 2007/0189765 A1* | 8/2007 | Schulte | .................... | G03B 5/02 396/529 |
| 2008/0252775 A1* | 10/2008 | Ryu | ...................... | H04N 5/2253 348/374 |
| 2008/0297925 A1* | 12/2008 | Chen | .................... | G02B 13/001 359/829 |
| 2011/0013901 A1* | 1/2011 | Utsugi | ................... | G02B 7/026 396/529 |
| 2011/0063498 A1* | 3/2011 | An | ....................... | H04N 5/2252 348/375 |
| 2012/0075520 A1* | 3/2012 | Tecu | ...................... | G03B 43/00 348/345 |

(Continued)

*Primary Examiner* — Twyler Haskins
*Assistant Examiner* — Wesley Chiu
(74) *Attorney, Agent, or Firm* — Lin & Associates Intellectual Property, Inc.

(57) ABSTRACT

An image-capturing apparatus is disclosed, including a lens driver module and a sensor module; wherein the lens driver module includes a lens housing chamber and a female engagement base, the lens housing chamber being for housing a lens, and the female engagement base being located inside the lens driver module; the sensor module includes a sensor and a male engagement base; the female engagement base being disposed on the male engagement base; and an optical calibration facility being used to adjust the lens driver module; when an optical axis of the lens driver module is parallel to a sensor optical axis of the sensor module, a glue is applied to fasten the lens driver module and the sensor module so that the female engagement base and the male engagement base do not move with respect to each other.

7 Claims, 5 Drawing Sheets

(56) References Cited

U.S. PATENT DOCUMENTS

| | | | |
|---|---|---|---|
| 2013/0063655 A1* | 3/2013 | Hsu | G02B 7/021 348/374 |
| 2013/0271856 A1* | 10/2013 | Rozitis | G02B 7/023 359/813 |
| 2015/0103240 A1* | 4/2015 | Kim | G02B 7/08 348/374 |
| 2015/0156381 A1* | 6/2015 | Oba | G02B 7/026 348/374 |
| 2016/0097912 A1* | 4/2016 | Kobori | H04N 5/2254 359/820 |
| 2016/0334597 A1* | 11/2016 | Bohn | G02B 7/023 |

* cited by examiner

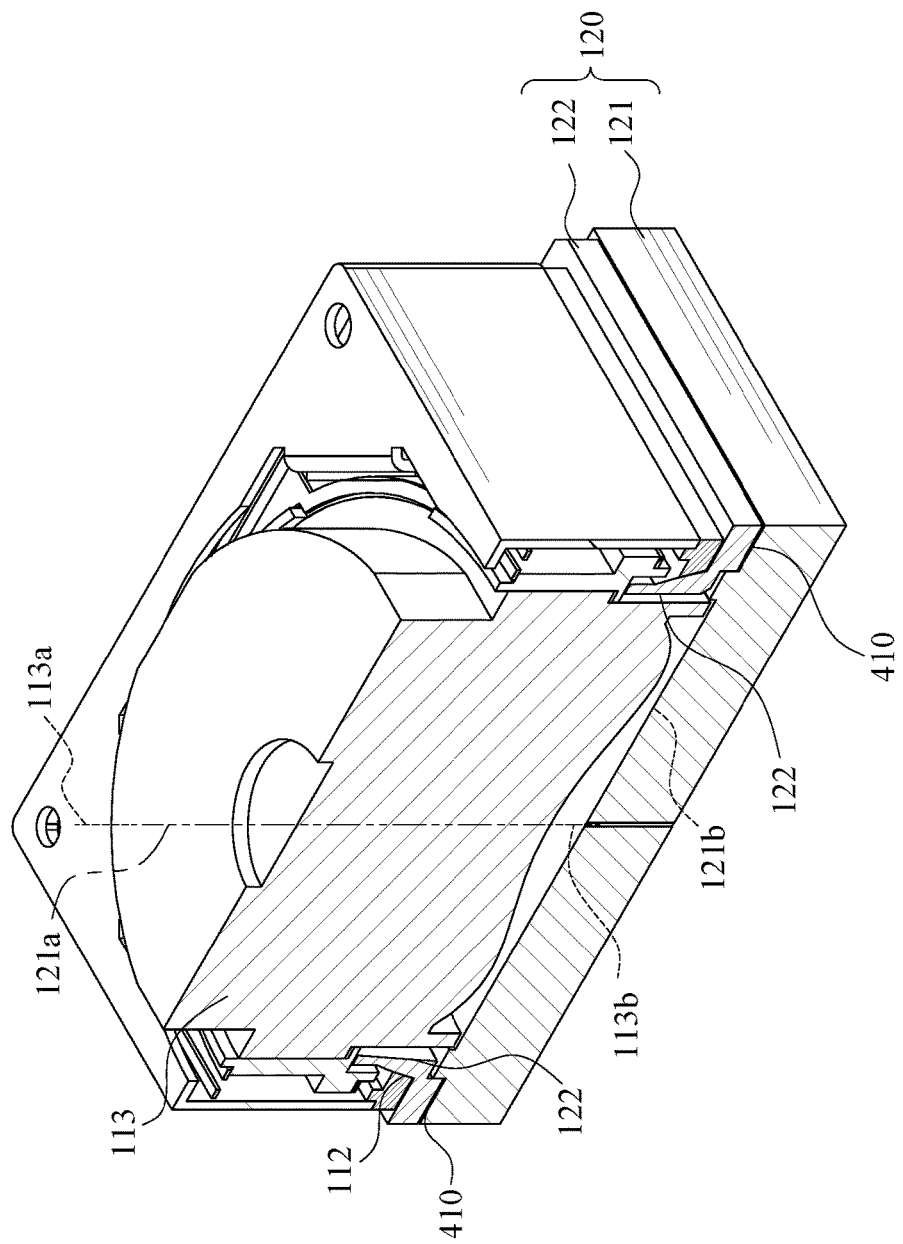

IMAGE-CAPTURING APPARATUS

CROSS-REFERENCE TO RELATED APPLICATION

The present application is based on, and claims priority form, Taiwan Patent Application No. 104201178, filed Jan. 23, 2015, the disclosure of which is hereby incorporated by reference herein in its entirety.

TECHNICAL FIELD

The technical field generally relates to a lens driver module, and in particular, to an image-capturing apparatus with lens driver.

BACKGROUND

A common practice of assembling a camera is to assemble the lens driver module and the sensor module first, and then dispose the lens module in the lens carrier of the lens driver module. Alternatively, the lens module is first installed in the lens carrier of the lens driver module and then the lens driver module is assembled to the sensor module. In either practice, the approach is to compensate for the tolerance of the components so that the optical axis of the lens module and the optical axis of the sensor module can be as parallel as possible.

When the precision of the manufactured component is too poor to be adjusted, the component must be discarded. For example, when the error between the plane of the lens driver module and the plane of the sensor module is too large, the optical axis of the lens module and the optical axis of the sensor module cannot be maintained within a tilt angle tolerance. A similar situation occurs when the error exists between the lens carrier and the lens module. Therefore, it is desirable to develop an apparatus able to compensate the manufacture tolerance of the components and provide higher manufacture and assembly margin to achieve optimal imaging effect.

SUMMARY

A primary object of the present disclosure is to provide an image-capturing apparatus, including a lens driver module and a sensor module; wherein the lens driver module including a lens housing chamber and a female engagement base, the lens housing chamber being for housing a lens, and the female engagement base being located inside the lens driver module; the sensor module including a sensor and a male engagement base; the female engagement base being disposed on the male engagement base; an optical calibration facility being used to adjust the lens driver module; when an optical axis of the lens driver module is parallel to a sensor optical axis of the sensor module, a glue is applied to fasten the lens driver module and the sensor module so that the female engagement base and the male engagement base do not move with respect to each other.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein:

FIG. 4B shows a cross-sectional view of adjusting the lens optical axis to become parallel with the sensor optical axis.

DETAILED DESCRIPTION OF THE DISCLOSED EMBODIMENTS

Figure 1:
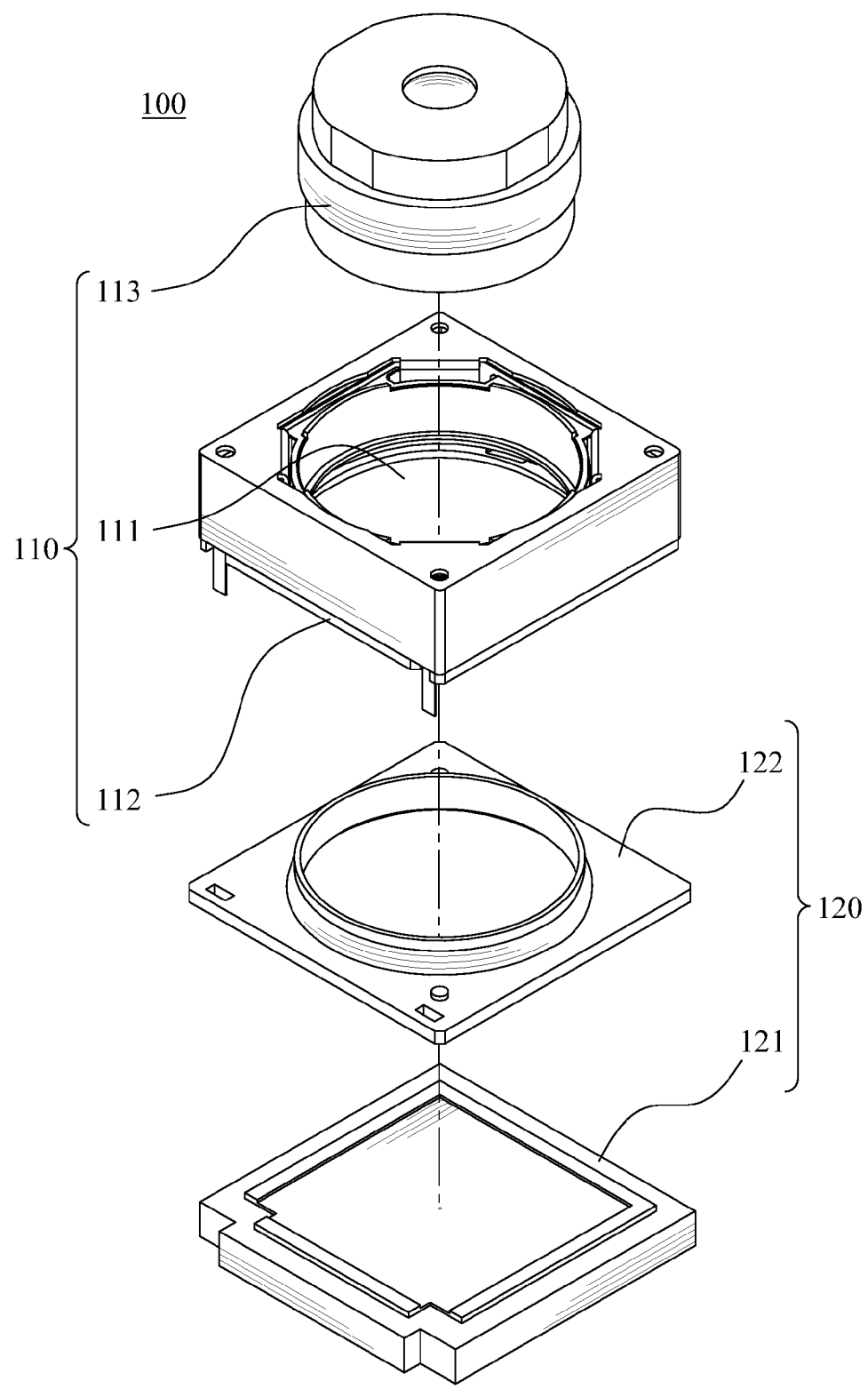
FIG. 1 shows a schematic view of a first exemplary embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an image-capturing apparatus, using a gimbal theory to achieve correcting the error between the optical axis of the sensor module and the optical axis of the lens module.

Figure 4A:
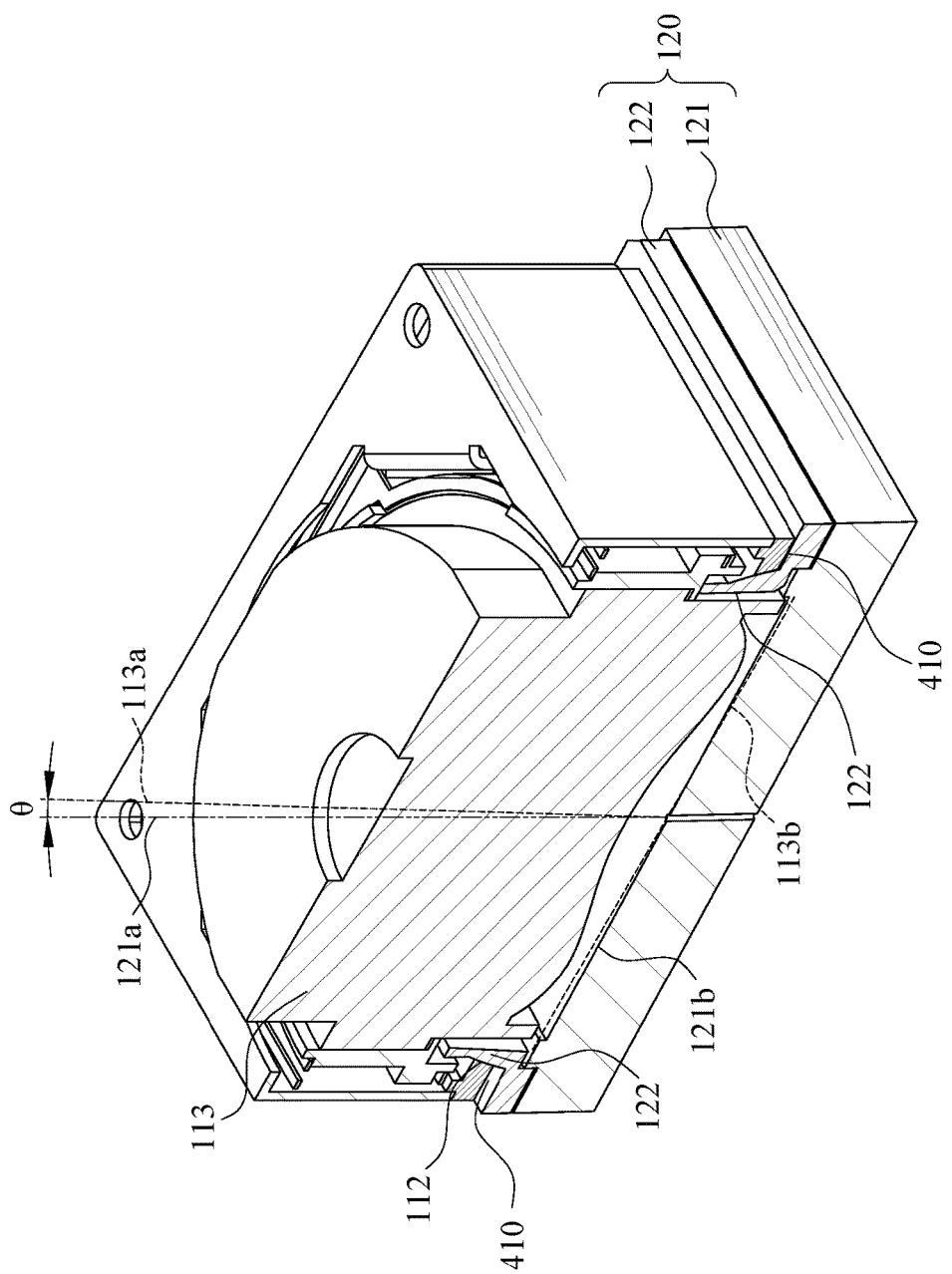
FIG. 4A shows a cross-sectional view of the engagement of the engagement base and optical axis adjustment of the engagement base.

FIG. 1 shows an embodiment of an image-capturing apparatus of the present disclosure. As shown in FIG. 1, the image-capturing apparatus 100 includes a lens driver module 110 and a sensor module 120. The lens driver module 110 further includes a lens housing chamber 111 and a female engagement base 112. The lens housing chamber 111 is for housing a lens 113, and the female engagement base 112 is located inside the lens driver module 110 to form a circumference. The sensor module 120 includes a sensor 121 and a male engagement base 122. The female engagement base 112 is disposed on the male engagement base 122. By using an optical calibration facility to adjust the lens driver module 110, when an optical axis of the lens driver module 110 is parallel to a sensor optical axis of the sensor module 120, a glue is applied to fasten the lens driver module 110 and the sensor module 120 so that the female engagement base 112 and the male engagement base 122 will not move with respect to each other. FIG. 4A and FIG. 4B will provide further explanation for the lens optical axis and sensor optical axis.

Accordingly, the female engagement base 112 uses the male engagement base 122 as a rotational center to achieve compensating the error between the lens optical axis of the lens driver module and the sensor optical axis of the sensor module. The female engagement base includes a circular hole with a surrounding wall, and the male engagement base is a matching circular protruding ring that can be inserted into the surrounding wall of the female engagement base. The ring of the male engagement base can also include a plurality of gaps so that the ring includes a plurality of protruding arcs.

Figure 2:
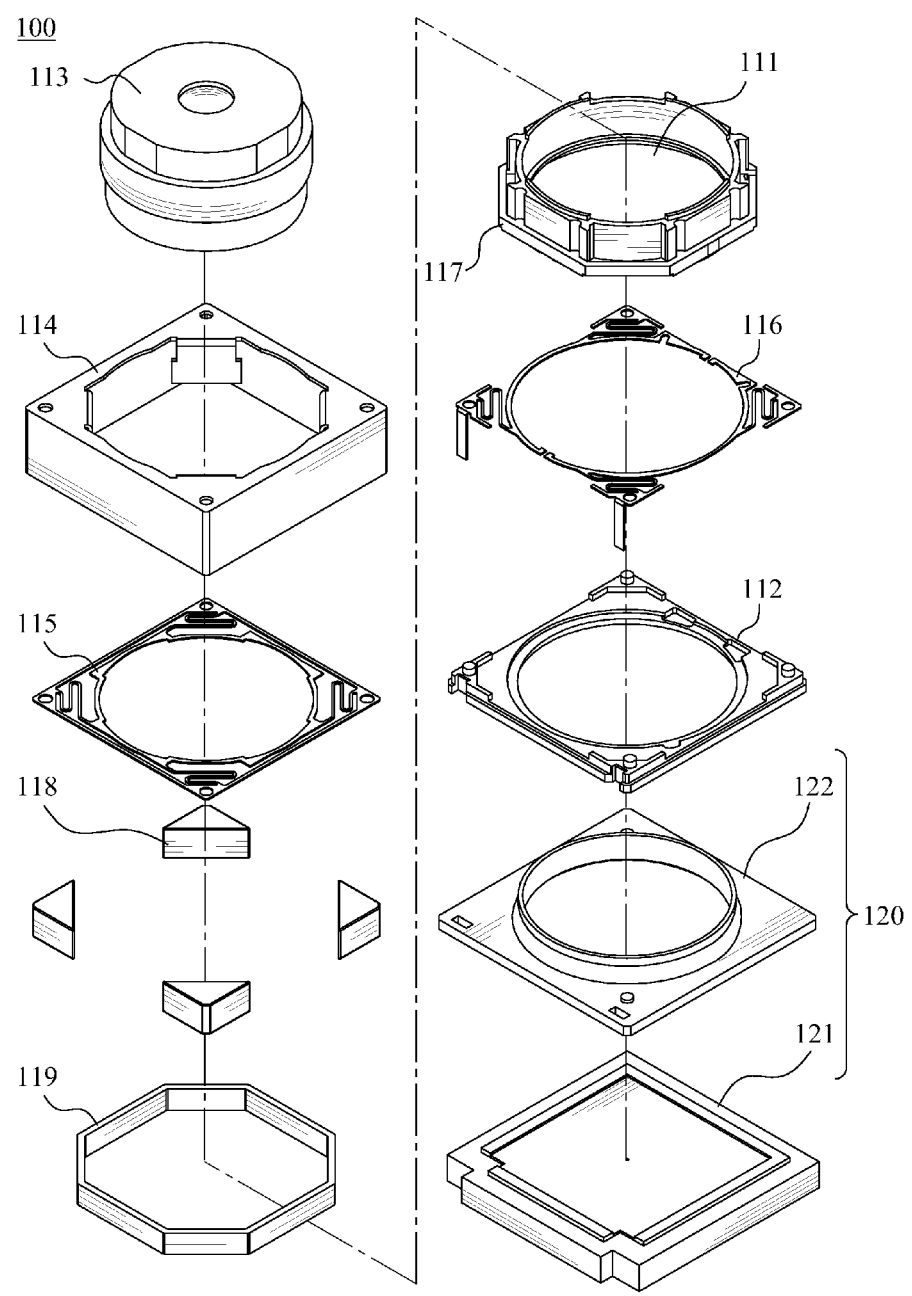
FIG. 2 shows an exploded view of the lens driver module and the sensor module.

FIG. 2 shows an exploded view of the image-capturing apparatus. As shown in FIG. 2, the lens driver module 110 further includes a cover lid 114, an upper resilient element 115, a lower resilient element 116, a lens carrier 117, a plurality of magnets 118, and a coil 119. The upper resilient element 115 and the lower resilient element 116 are disposed respectively above and below the lens carrier 117. The plurality of magnets 118 and the coil 119 are disposed respectively surrounding the lens carrier 117. The upper resilient element 115, the lower resilient element 116 and the lens carrier 117 are disposed at the cover lid 114. The female engagement base 112 is disposed below the cover lid 114. The lens module 113 is located inside the lens housing chamber 111. The male engagement base 122 of the sensor module 120 is disposed above the sensor 121.

Figure 3:
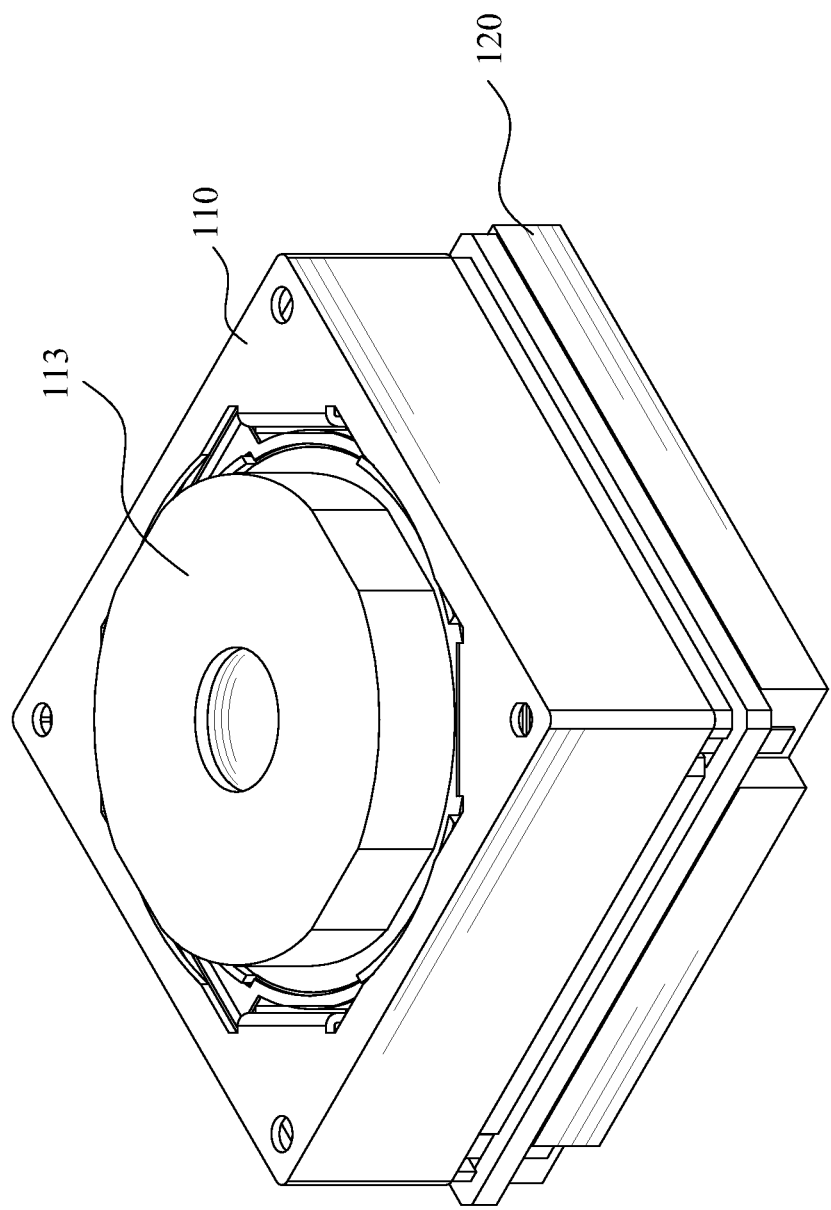
FIG. 3 shows a schematic view of an image-capturing apparatus after assembly.

FIG. 3 shows a schematic view of the image-capturing apparatus after assembly. As shown in FIG. 3, the lens module 113 is disposed in the lens driver module 110, and the sensor module 120 is disposed below the lens driver module 110.

FIG. 4A shows a cross-sectional view of the engagement of the female engagement base and the male engagement base. As shown in FIG. 4A, the inner edge of the female engagement base 112 of the lens driver module 110 presses tightly against the outer side of the male engagement base 122 of the sensor module 120, and a gap 410 exists between the lens driver module 110 and the sensor module 120. Because the gap 410 on the right side is larger than the gap 410 on the left side, the lens optical axis 113a of the lens module 113 of the lens driver module 110 forms an optical axis error θ with the sensor optical axis 121a of the sensor module 120.

FIG. 4B shows a cross-sectional view of adjusting the lens optical axis and the sensor optical axis to become parallel. As shown in FIG. 4B, the gap 410 serves the function of compensating the optical axis error between the lens optical axis 113a of the lens module 113 of the lens driver module 110 and the sensor optical axis 121a of the sensor module 120. That is, the gap 410 is reserved as space for adjusting the lens optical axis 113a of the lens driver module 110 so that the lens optical axis 113a and the sensor optical axis 121a lie on the parallel lines, which leads the image-forming plane 113b of the lens module 113 and the sensor surface 121b of the sensor module 120 being located at the same level. In other word, when the lens optical axis 113a and the sensor optical axis 121a are adjusted to be parallel or on the same line, the optical axis error will be eliminated.

Accordingly, the rotational center of the female engagement base and the male engagement base is located on an image-forming plane of the lens module.

In summary, the image-capturing apparatus uses the fixing engagement base as a center. By adjusting the engagement base to achieve calibrating the optical axis error between the sensor module and the lens module. The image-capturing apparatus of the present disclosure provides more resilient margin to achieve improving the yield rate and reducing the manufacturing cost.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image-capturing apparatus, comprising:
    a lens driver module, further comprising a lens housing chamber and a female engagement base, the lens housing chamber being for housing a lens module, and the female engagement base being located inside the lens driver module, the lens module having a lens optical axis;
    a sensor module, further comprising a sensor and a male engagement base, and the male engagement base being located above the sensor, the sensor module having a sensor optical axis; and
    an optical calibration facility including a gap formed between the lens driver module and the sensor module by tightly pressing an inner edge of the female engagement base against an outer side of the male engagement base, the gap being adjustable for maintaining different gap sizes on different sides so that the lens optical axis can be in parallel with the sensor optical axis;
    wherein the female engagement base is disposed on the male engagement base;
    the optical calibration facility is used to adjust the lens driver module; when the lens optical axis is in parallel with the sensor optical axis, a glue is applied to fasten the lens driver module and the sensor module so that the female engagement base and the male engagement base do not move with respect to each other.

2. The image-capturing apparatus as claimed in claim 1, wherein a rotational center of the female engagement base and the male engagement base is located on an image-forming plane of the lens module.

3. The image-capturing apparatus as claimed in claim 1, wherein a rotational center is formed by the female engagement base and the male engagement base to achieve compensating an optical axis error between the lens optical axis and the sensor optical axis.

4. The image-capturing apparatus as claimed in claim 1, wherein the female engagement base has a circular hole surrounded by a wall.

5. The image-capturing apparatus as claimed in claim 1, wherein the male engagement base has a circular protruding ring.

6. The image-capturing apparatus as claimed in claim 1, wherein the male engagement base has a plurality of protruding arcs.

7. The image-capturing apparatus as claimed in claim 1, wherein the glue is any of the following: a dispensed glue, a solder, and a superglue.

* * * * *